(12) United States Patent
Donkin et al.

(10) Patent No.: US 7,102,849 B2
(45) Date of Patent: Sep. 5, 2006

(54) MODULAR DATA CARTRIDGE LIBRARY

(75) Inventors: Charles William Donkin, Wells (GB); Robert Vernon Elliot, Wells (GB); Brian Kenneth Geoffrey Hext, Wells (GB)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 10/859,960

(22) Filed: Jun. 4, 2004

(65) Prior Publication Data

US 2004/0218305 A1   Nov. 4, 2004

Related U.S. Application Data

(63) Continuation of application No. 10/142,874, filed on May 13, 2002, now abandoned.

(30) Foreign Application Priority Data

May 12, 2001 (GB) ................. 0111638.3

(51) Int. Cl.
G11B 15/68 (2006.01)
(52) U.S. Cl. .................................... 360/92
(58) Field of Classification Search ............... 360/92, 360/93; 369/30.48
See application file for complete search history.

(56) References Cited

U.S. PATENT DOCUMENTS

| 4,984,897 | A | * | 1/1991 | Baranski ................ 360/92 |
| 5,429,470 | A | | 7/1995 | Nicol et al. |
| 5,570,337 | A | | 10/1996 | Dang |
| 6,064,544 | A | * | 5/2000 | Wada ..................... 360/92 |
| 6,085,123 | A | | 7/2000 | Baca et al. |
| 6,574,173 | B1 | * | 6/2003 | Manes ................. 369/30.48 |
| 2001/0000062 | A1 | * | 3/2001 | Ostwald et al. ......... 104/88.02 |
| 2002/0168252 | A1 | * | 11/2002 | Williams ................ 414/277 |
| 2002/0182039 | A1 | * | 12/2002 | Ostwald .................. 414/281 |

FOREIGN PATENT DOCUMENTS

| EP | 1 045 383 A2 | 10/2000 |
| EP | 1 045 383 A3 | 10/2000 |
| GB | 2 377 542 A | 1/2003 |

OTHER PUBLICATIONS

Examination Report mailed on Mar. 16, 2004 for GB patent application No. 0111638.3 filed on May 12, 2001, 3 pages.

* cited by examiner

*Primary Examiner*—William Klimowicz
*Assistant Examiner*—Mark Blouin
(74) *Attorney, Agent, or Firm*—Morrison & Foerster LLP (57) ABSTRACT

A data storage library comprising a plurality of library modules (13, 15) for storing a plurality of data storage media (35) and writing data to and reading data from said media (35), at least two of said library modules (13, 15) being in adjacent vertical arrays, and transfer means (33) for transferring said media (35) from one array to an adjacent array, the transfer means (33) effecting translation of the data storage media (35) from one array to the adjacent array in a substantially horizontal direction whilst substantially maintaining the orientation of the transferred media (35) relative to respective arrays.

17 Claims, 7 Drawing Sheets

MODULAR DATA CARTRIDGE LIBRARY

This application is a Continuation of application Ser. No. 10/142,874 Filed on May 13, 2002 now abandoned This invention concerns data storage and particularly data storage libraries which store a plurality of individual data storage media, the data being stored by the individual storage media, for example in magnetic or optically readable form.

So-called libraries in which data is stored in magnetic or optical form on a plurality of individual storage media which can be selectively fed to an appropriate reader of the data are well known in the art. Particular data storage media which have been used include magnetic tape cartridges and cassettes, tape spools, magnetic storage discs, and data stored in optically readable form, for example on a storage disc.

In general, such storage libraries store the media in racks, drums or magazines, or on shelves, from which individual media can be extracted by a transport mechanism which conveys them to a data drive where data is read from or written to them, to other positions within the library, or even to another library.

Access to or storage of the storage media is usually effected using robotic hands or pickers which withdraw individual storage media from where they are held and pass them for example to read/write devices where reading or writing of data takes place or to other locations within the library. Thereafter the individual media are returned to a storage location within the library, a computer being used to maintain an inventory of the positions where individual data storage media are placed so that the correct data storage medium can be retrieved when desired.

Such libraries are often housed in electrical equipment racking-style cabinets. However, unless all of the stored media within these cabinets can be fed to and from all of the read/write devices within a particular cabinet, data storage media in extended library configurations formed from a plurality of individual library modules within a racking-style cabinet effectively remain as separate libraries however close physically the data storage media in one library are to the data storage media in the other library modules. In other words, if some of the data storage media within a racking-style cabinet cannot be processed by the read/write devices of other library modules within the cabinet, these data storage media are in separate libraries.

Expanding the storage capacity of data storage libraries by adding extra library modules is an attractive concept, but it presents problems in practice. Thus, although it is possible to stack a number of individual library modules one above another in 483 mm (19 inch) racking, for example up to ten of some types in racking which is 1829 mm (6 foot) high, the individual library modules remain separate and do not function as a single library unless means are provided for physically transferring storage media vertically up and down from one library module to any of the others.

It has been proposed hitherto to effect such a transfer by the use of a vertical shuttle, for example as described in GB2345375-A, the stack of library modules then functioning as one large library, the shuttle being used to pass individual cartridges from one library module to another. In practice, one of the interconnected library modules is also connected to a controlling computer which maintains an inventory of the data storage media within the extended library. This library then acts as a pseudo-master library module, the others acting as slave libraries under the control of the pseudo-master library module. The pseudo-master library module is referred to as such because the computer to which it is connected is in fact in control of the extended library, the slave library modules being connected to the computer via the pseudo-master. Thus the slave modules could act as pseudo-master modules by making the connection to the computer through them rather than the original pseudo-master.

Further expansion of such libraries by adding additional library modules on top of an existing stack of library modules eventually becomes physically impossible. It is, of course, possible to place two or more of such libraries adjacent one another and to connect them electronically using a master computer to control the individual libraries. However, the problem of having separate libraries rather than a single library returns because individual cartridges cannot be automatically transferred from one library to another.

It has been proposed hitherto that in order to overcome this problem by the use of a turntable device positioned between adjacent racks. Individual magnetic tape cartridges which are to be transferred between adjacent racks are then fed onto the turntable device by a robotic arm in one rack, the turntable is rotated through 180° about a vertical axis, and a robotic arm in the second rack then removes the cartridge from the turntable device. However, such transfers tend to be slow because they involve a considerable number cartridge movements and interactions in order to bring the cartridges into the correct orientation within the rack to which they have been transferred before they are either passed to library modules within that rack or they are passed to the next adjacent rack.

According to the present invention there is provided a data storage library comprising a plurality of library modules for storing a plurality of data storage media and writing data to and reading data from said media, at least two of said library modules being in adjacent vertical arrays, and transfer means for transferring said media from one array to an adjacent array, the transfer means effecting translation of the data storage media from one array to the adjacent array in a substantially horizontal direction whilst substantially maintaining the orientation of the transferred media relative to respective arrays.

Data storage libraries in accordance with the present invention enable data storage media to be rapidly transferred from one rack to another without the necessity for the multiple changes of orientation in moving them from one rack to the next which is required by the prior art libraries referred to above.

An embodiment of data storage library in accordance with the present invention will now be described with reference to the accompanying diagrammatic drawings in which.

Figure 1:
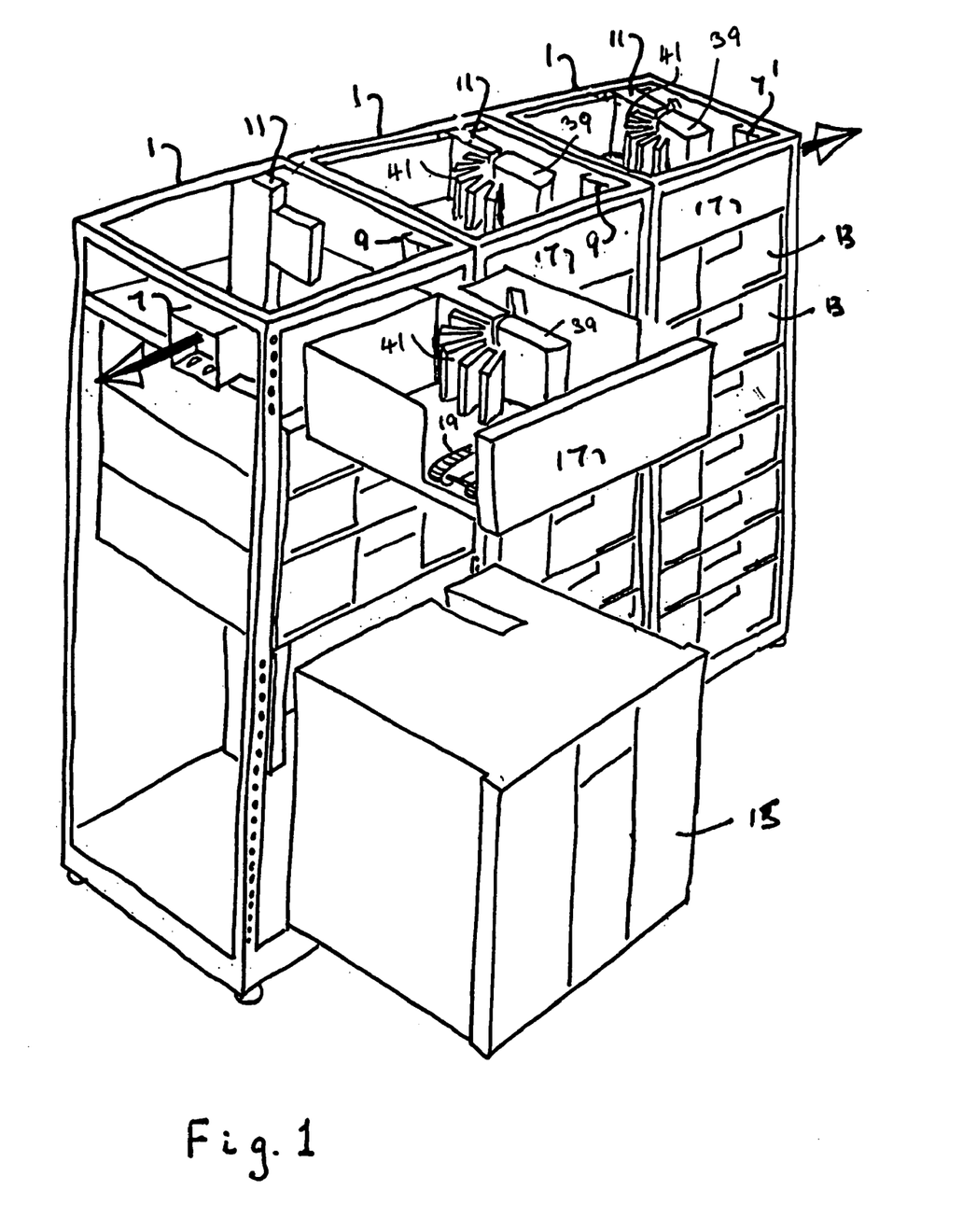
FIG. 1 is a perspective view of the embodiment with certain components slid forward.

The embodiment of data storage library shown in FIG. 1 is constructed in three 19 inch racks 1 which are bolted together side by side. This is shown more clearly in FIG. 2, two racks being shown in position for being bolted together, with the third ready to be connected to them by nuts 3 and bolts 5.

Figure 2:
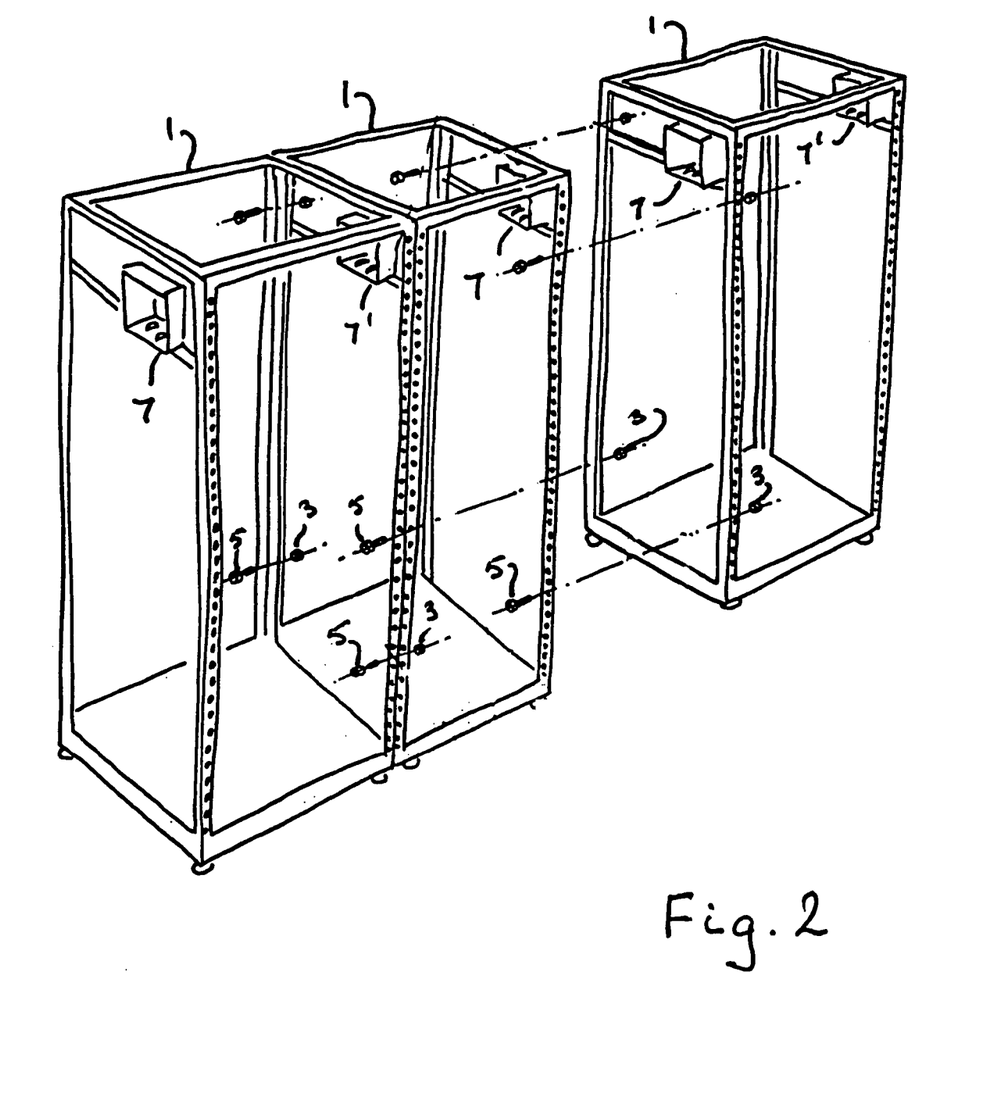
FIG. 2 is a perspective view of racking for the embodiment in the course of construction.

Opposite sides of each section of rack 1 are provided with complementary halves 7 and 7' of a transfer port 9, the halves 7 and 7' interlocking to form the ports 9. Alternatively, complete transfer ports can be positioned between adjacent racks 1 when the latter are being joined together.

The rear of each section of rack 1 is also provided with a shuttle 11 to facilitate the vertical transfer of data cartridges between different levels within the individual racks 1.

Each rack 1 also contains a vertical stack of library modules which can be single height 13 or multiple height 15 modules, for example they can be data storage systems of the type described in GB2345375-A.

At the top of each vertical stack of data storage modules (13, 15) is a horizontal link module 17, the modules 17 in each rack 1 being identical.

Figure 3A:
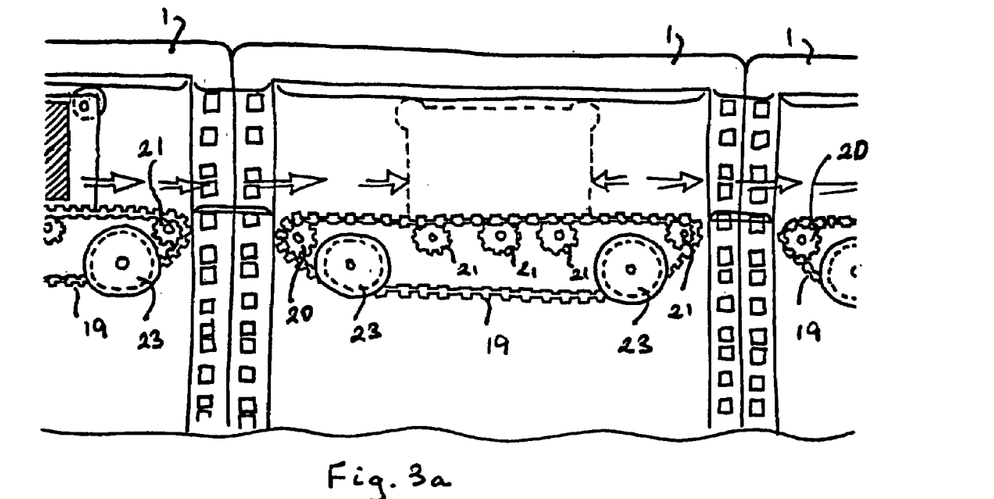
FIGS. 3a–b respectively show a cut away front view of a single link module of the embodiment with adjacent link modules attached, and a plan view of associated link modules.
Figure 3B:
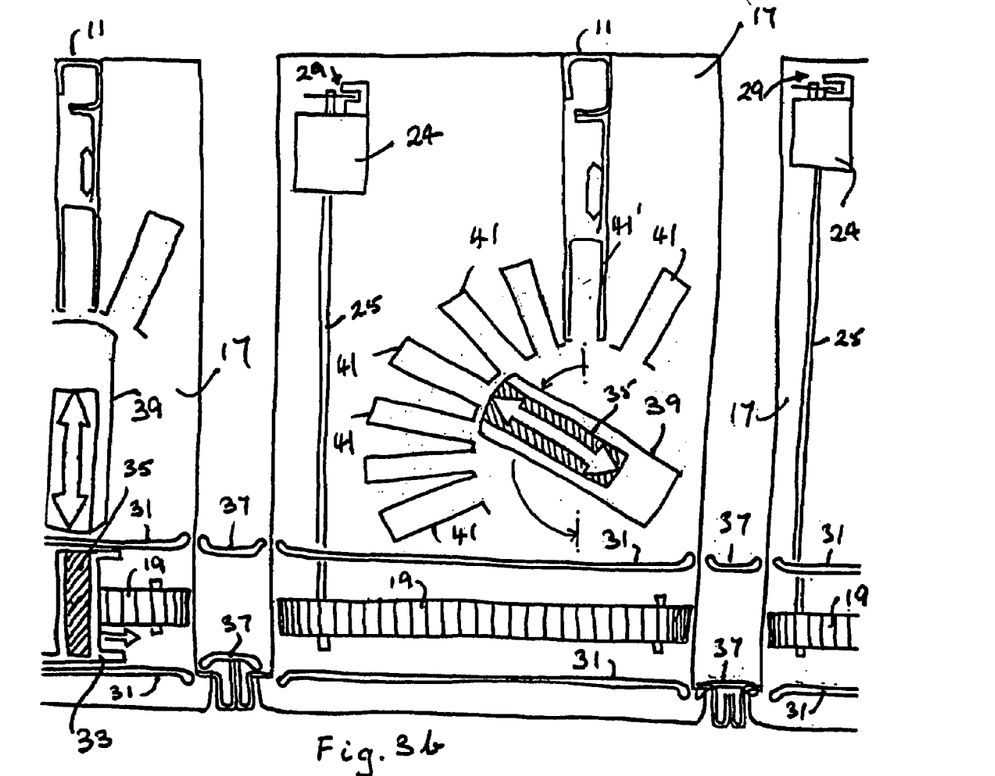

The horizontal link modules 17 are shown in more detail in FIGS. 3a–b, FIG. 3a being a cut away elevation of a top portion of a rack 1, further racks 1 being bolted to either side thereof, and FIG. 3b being a plan view of the horizontal link modules 17. A toothed belt 19 at the front of each module 17 has teeth on its inner and outer surfaces, the belt 19 passing over a toothed drive gear 20, four idler gear wheels 21, and guide wheels 23. The toothed belt 19 is driven by a motor 24 via a drive shaft 25 and through the toothed drive gear 20, angular movement of the drive shaft 25 being detected by a tacho 29.

Two guides 31 extend along either side of the toothed belt 19 and they serve to guide a carriage 33 for data cartridges 35 when the carriage 33 is being moved by the belt 19. The under side of the carriage 33 is toothed and it is located on the belt 19 by the teeth on the outer surface of the belt 19.

Guides 37 in the transfer port 9 between adjacent horizontal link modules 17 serve to maintain the correct alignment of the carriage 33 as it is fed from the drive belt 19 of one horizontal link module 17 to that of the next module 17.

The lower interior surface of the transfer port 9 is smooth to facilitate sliding of the cartridges 35 through the port 9 as they are pushed by the belt 19 of one rack 1 into engagement with the belt 19 of the adjacent rack 1.

Each horizontal link module 17 has a robotic hand or picker 39 which is rotatable about a fixed vertical axis, and a plurality of radially extending storage slots 41 for receiving and temporarily storing cartridges 35 inserted into them by the robotic hand or picker 39. A gap 41' between two of the slots 41 is aligned with and houses the shuttle mechanism 11 so that cartridges 35 fed into the gap 41' are fed on to the shuttle mechanism 11 and thence to the single height modules 13 and/or to the multiple height modules 15.

The horizontal link modules 17 therefore enable cartridges 35 to be transferred from one rack to another, and so any cartridge 35 within any of the racks 1 can be fed to and from a read/write device in any of the single height modules 13 or the multiple height modules 15 in any of the racks 1, thereby enabling the plurality of racks 1 and associated library modules (13, 15) to operate as a single library.

The carriage 33 has five slots for carrying cartridges 35, the output from the tacho 29 being used to control the motor 24 so that the carriage 33 can be stopped with a slot in the carriage 33 containing a particular cartridge 35 to be aligned with the robotic hand or picker 39.

In general, the position of particular cartridges 35 within the overall library system will be recorded in a central computer, from information on the cartridges when they are first inserted into any one of the library modules (13, 15), cartridges 35 being identified by suitable means, for example by the use of bar codes on them. It is therefore generally unnecessary to position a bar code reader on the robotic hand or picker 39, but the inclusion of such a device could be of value if the controlling computer were to lose and/or corrupts cartridge inventory data.

Operation of the robotic hand or picker 39 in pulling cartridges 35 on to it or pushing them off it on to the carriage 33 or into the slots 41 or on to the shuttle 11 in gap 41' is similar to that of the picker device 20 of the systems described in GB2345375-A except that the robotic hand or picker 39 is only rotatable about a fixed vertical axis, it being unable to translate within the horizontal transfer devices 17. The total angle of rotation which the robotic hand or picker 39 can make will depend on the number and position of the slots 41 but in general it will be at least 180° to enable a cartridge to be pulled off the carriage 33 and then pushed into the vertical shuttle mechanism 11. However, the inclusion of one or more further slots 41 beyond the gap 41', as shown in FIGS. 3a–b and 4a–b, will require a larger angle of rotation, for example of the order of 270°.

The robotic hand or picker 39 and its functioning will now be described in more detail with reference to FIG. 5. Rotation of the robotic hand or picker 39 is effected using a motor 43 which drives a sprocket (not shown) which engages teeth of a toothed belt 45 attached to a drum attached to the floor of the horizontal transfer device 17. In order to remove a particular cartridge 35 from the carriage 33, for example the extreme right slot as shown in the left most rack 1 in FIG. 4b, the carriage 33 is stopped and the robotic hand or picker 39 is rotated so that the slot in the carriage 33 carrying the cartridge 35 and the carrier slot 47 on the robotic hand or picker 39 are aligned.

A pick 49 on the robotic hand or picker 39 can be moved inwardly and outwardly using a drive motor (not shown) which through a toothed belt and sprocket rotates a screwed shaft to which the pick 49 is attached. In addition to being moveable towards and away from the body of the robotic hand or picker 39, the pick 49 can also be moved from side to side so that a nib 51 on the pick 49 can be moved into and out of engagement with a conventional recess (not shown) in the cartridges 35 when suitably positioned relative thereto, for example by rotation of the picker 39 about its vertical axis of rotation.

Movement of cartridges 35 in the slot 47 is facilitated by upper and lower guide rollers 53 and 55, movement into the slot 47 being continued until the cartridge in the slot 47 actuates a limit switch 57 Which prevents further movement of the cartridge in the slot 47.

The robotic hand or picker 39 is then rotated through the desired angle so that the slot 47 becomes aligned with the desired slot 41 or the gap 41', and the pick 49 is moved out relative to the robotic hand or picker 39 using its associated motor until the cartridge being moved is fully in the desired slot 41 or the gap 41'. Limit switches (not shown) can be used to sense that the cartridge 35 has reached its desired position, thereby preventing the robotic hand or picker 39 from being rotated if the cartridge 35 is not in its correct position in the slots 41 or on the shuttle 11 in the gap 41'.

Removal of a cartridge 35 from the slots 41 or the gap 41' (i.e. from the shuttle mechanism 11) and passing them to a slot in the carriage 33 or to another of the slots 41 or the gap 41' is in essence the reverse of the steps just described.

Figure 4A:
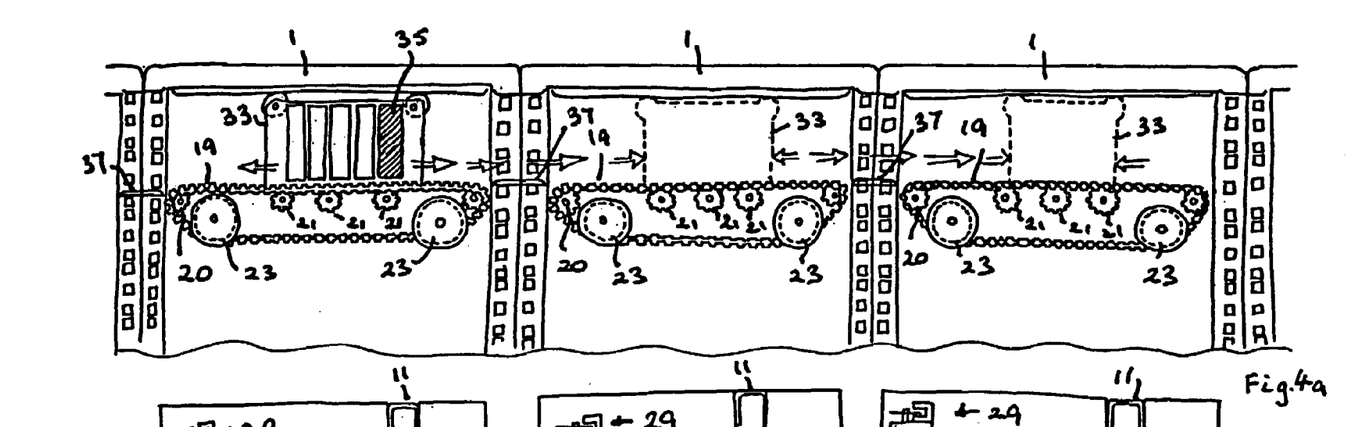
FIGS. 4a–b respectively correspond to FIGS. 3a–b but show three link modules connected together.
Figure 4B:
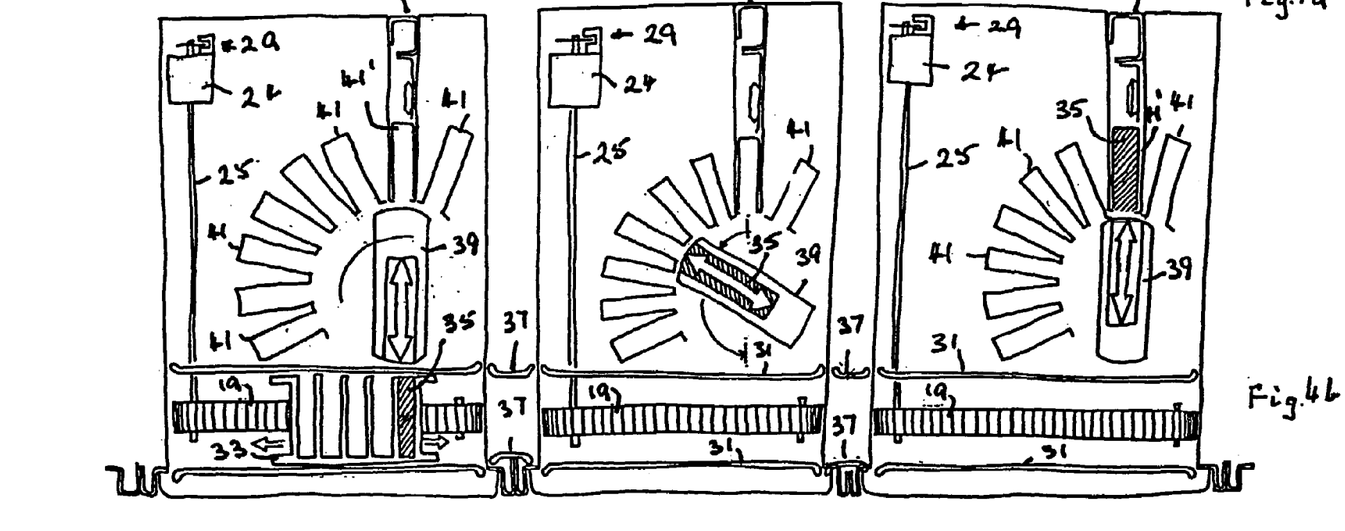
Figure 5:
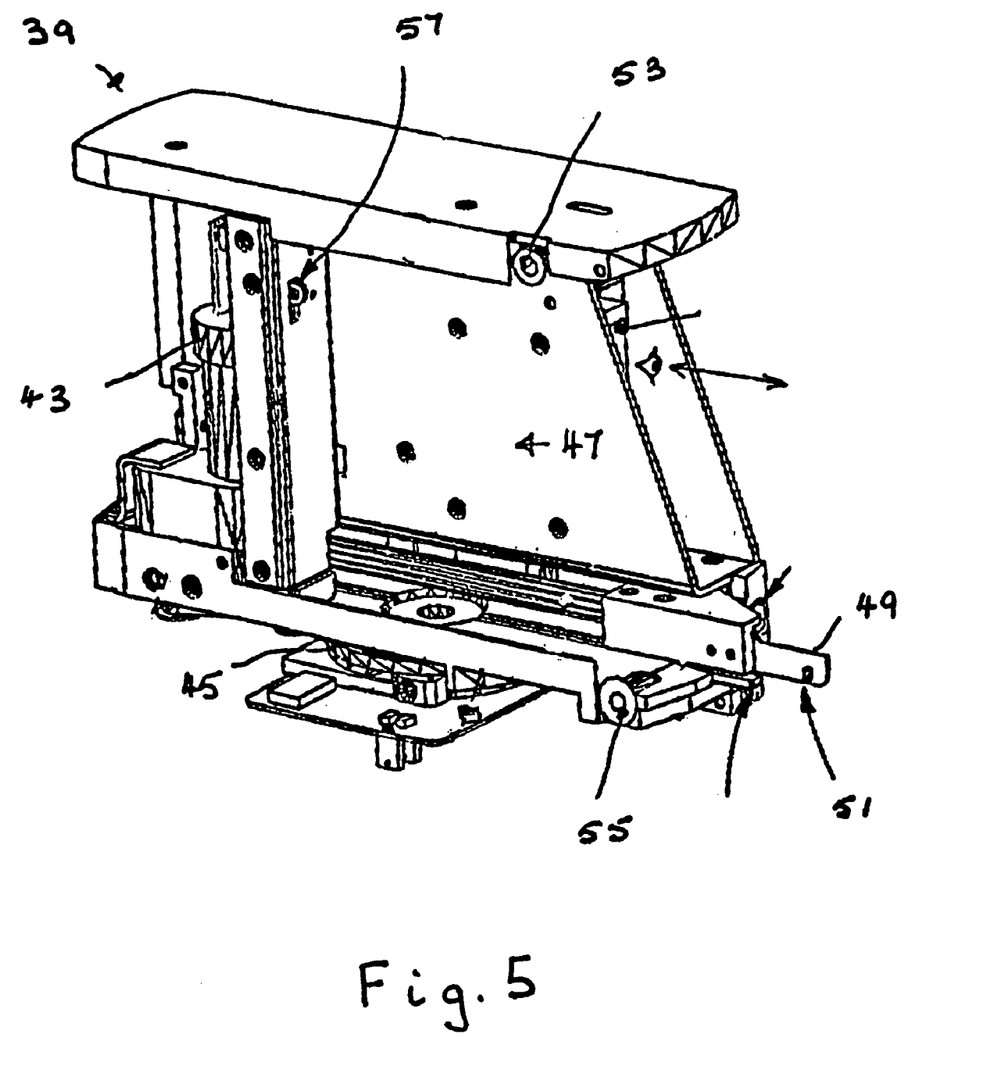
FIG. 5 is a perspective view of a cartridge selector and transporter of the various link modules.

FIG. 4b shows three racks 1, that on the left showing a cartridge 35 which is to be moved from the extreme right hand slot in the carriage 33 to the vertical shuttle mechanism 11 in the gap 41', that in the center showing the cartridge 35 on the robotic hand or picker 39 after rotation of the latter through approximately 120°, and that on the right showing the cartridge 35 on the vertical shuttle mechanism 11 in the gap 41'.

Figure 6:
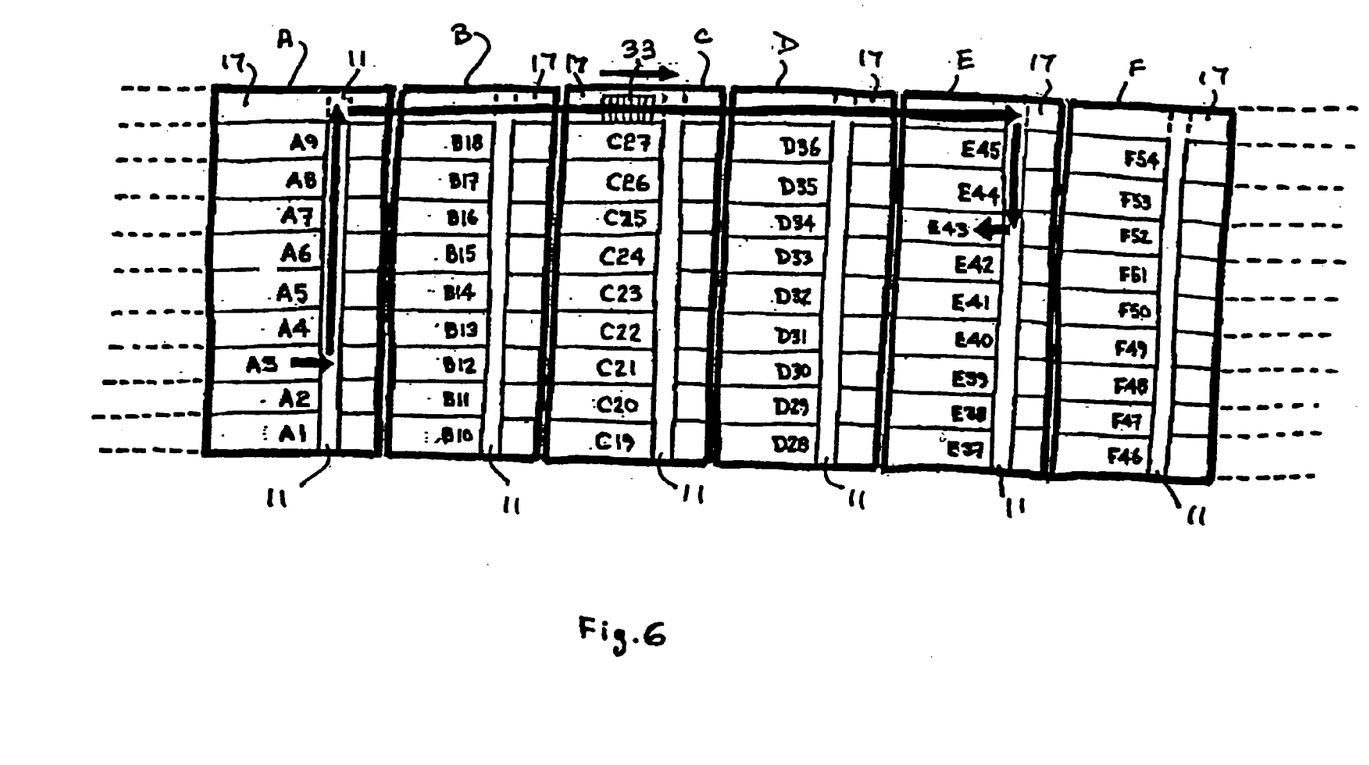
FIG. 6 is a schematic diagram of the functioning of this embodiment of data storage library.

A schematic diagram of the functioning of the above embodiment of data storage library is shown in FIG. 6. Six racks of equipment A–F are shown, each including a plurality of magnetic data storage library modules A1–9, B10–18, C19–27, D28–36, E37–45 and F46–54, a vertical shuttle mechanism 11 for passing cartridges up and down within the respective racks A–F, and a horizontal transfer device 17 which enables cartridges to be passed between adjacent ones of the racks A–F.

One of the modules in the rack of equipment designated A is connected to a computer which records the library inventory, and it functions as the pseudo-master module for the overall library, the equipment in the racks designated B–F functioning as slave library modules. The module connected to the computer can be the link module, one of the library modules, or another module dedicated to the purpose by providing these modules with suitable electronic circuitry. Furthermore, the circuitry can provide for any of the modules in any of the racks to function as the pseudo-master for the overall library.

FIG. 6 also shows how a cartridge can be moved, for example, from library module A3 in rack A to library module E43 in rack E.

The first step in the transfer is the selection of the desired cartridge from the library module A3 and its transfer to the shuttle mechanism 11 of rack A. The shuttle mechanism 11 in rack A then lifts the cartridge to the horizontal link module 17 in rack A where it enters the gap 41' between the slots 41. The picker 39 then pulls the cartridge from the shuttle mechanism 11 on to itself, rotates through 180°, and then pushes the cartridge into a slot on the carriage 33, the latter having first been brought into the correct position to receive the cartridge from the picker 39.

The belt 19 on which the carriage 33 is resting is then started, thereby pushing the carriage 33 towards the link module 17 in rack B, through the transfer port 9 between racks A and B, and on to the belt 19 in rack B. Belt 19 in rack B is started and this in turn drives carriage 33 into rack C.

A similar series of steps transfers the carriage 33 through rack D and into rack E where carriage 33 is stopped opposite the picker 39 in rack E.

The picker 39 in rack E then transfers the cartridge to the shuttle mechanism 11 in rack E, the latter moving the cartridge down within rack E until it reaches library module E43. The cartridge is then moved from the shuttle 11 into module E43 where it can be moved to a desired position within the module.

As will be appreciated, cartridges in data storage libraries in accordance with the present invention can be moved from a storage location in one library module in one rack to a storage location in the same library module, to a different library module in the same rack, to a different library module in another rack, or to a read/write drive in any of the racks. Furthermore, they can be passed from a read/write drive in a library module in one rack to a storage location in the same or a different rack. In addition, such transfers can be effected whilst the library itself is reading and/or writing data from or to other cartridges therein.

Further racks of slave library modules plus a horizontal link device 17 can simply be added to the end of the illustrated array, cartridges 35 being fed through the newly formed transfer port 9 from slave library rack F to the additional rack of equipment, and without rotation of the cartridges 35 during their transfer from one rack to the next.

Additionally or alternatively further racks of slave library modules and horizontal link devices can be added to the left or right of the pseudo-master library A, FIG. 6 showing them added to the right.

Figure 7:
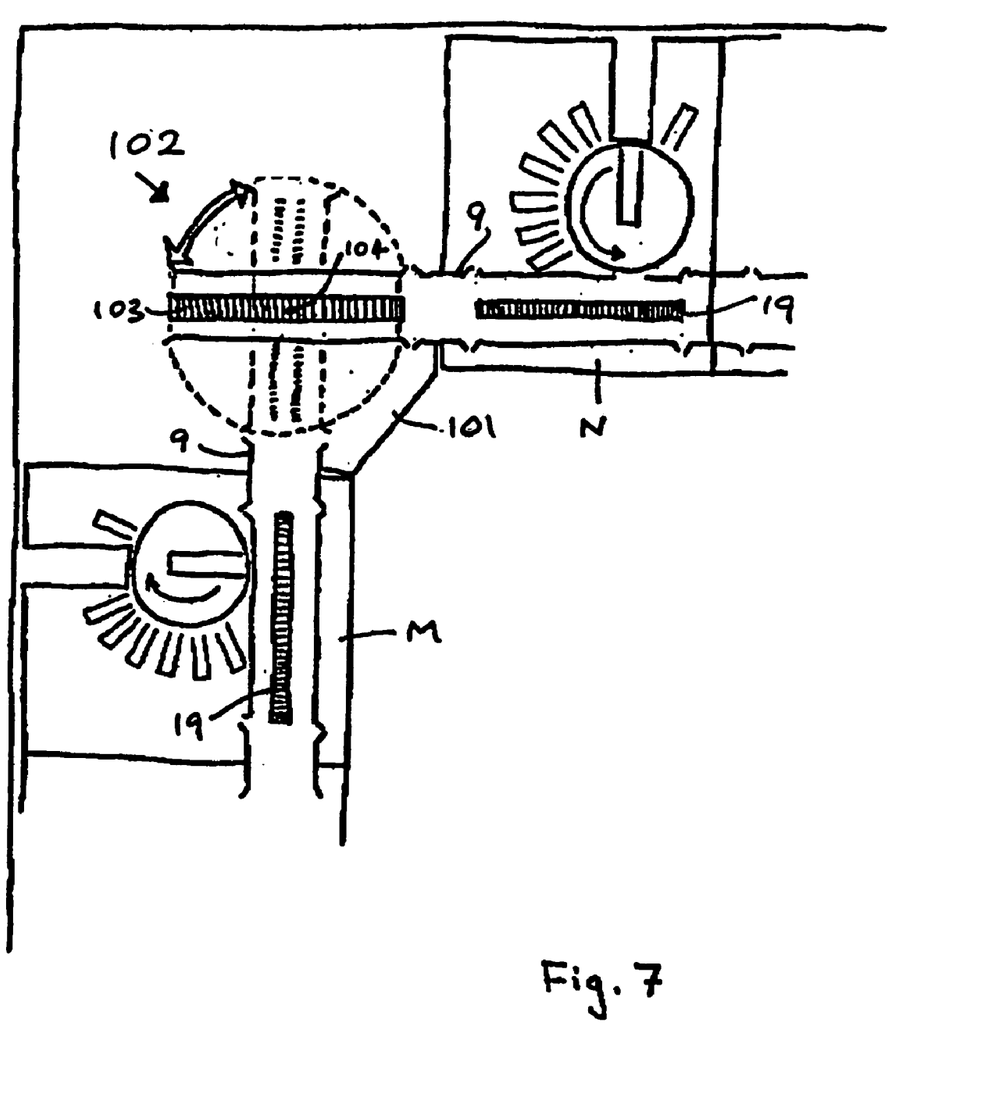
FIG. 7 is a plan view of a device for transporting cartridges between racks which are not in line with each other.

The addition of further racks of library and horizontal link modules in a continuous line as shown in FIG. 6 eventually becomes impossible due to the physical limitations of the space in which the racks 1 are located. FIG. 7 shows a solution to the problem, a corner rack 101 connecting two racks M and N each containing a horizontal link module and one or more library modules.

Two transfer ports 9 between the racks M and N and the corner rack 101 facilitate the passage of the carriage 33 to and from racks M and N via the rack 101, a turntable device 102 being used to rotate the carriage 33 through 90° in order to achieve this.

The turntable device 102 includes a toothed belt 103 which is similar to the belts 19 in the horizontal link modules 17 and it is driven by a motor (not shown) in a similar manner to the belts 19. A tacho driven by the drive motor for the belt 103 enables the carriage 33 to be correctly positioned on the belt 103 substantially mid-way along its length.

A drive mechanism (not shown) enables the turntable device 102 to be rotated through substantially 90° about a vertical axis 104 so that the belt 103 is moved from the position indicated by solid lines in FIG. 7, where it is in line with the belt 19 in rack N, to that indicated by broken lines in FIG. 7, where it is in line with the belt 19 in rack M.

It will be noted that despite rotation of the carriage and the cartridges by the device 102, the slots in the carriage 33 open towards the picker 39, thereby avoiding the problem with prior art turntable devices referred to herein where the slots, and therefore the cartridges, point in the wrong direction for subsequent handling with the library modules.

Although cartridges can, as described above with reference to FIG. 6, be transferred directly from one library module to another, they can also be stored in the slots 41, for example to increase the overall capacity of the extended library or as a temporary holding position, for example to enable a higher priority cartridge transfer to be effected in which one cartridge is made to overtake another.

In general library systems in accordance with the present invention will include only one carriage within a plurality of inter-connected horizontal link modules. However, the use of two or more of such carriages may be of advantage in some systems.

As an alternative to the picker 39 in the horizontal link modules 17, a similar effect can be achieved by incorporating the link module in the top of a multi-height library module and using the hand or picker device of the library module to transfer cartridges 35 directly from the library module into a slot in the carriage 33.

The invention claimed is:

1. A data cartridge library, comprising:
   a plurality of library modules, each library module capable of holding data cartridges, the plurality of library modules arranged in a first column and an adjacent second column; and
   a first conveyor disposed with the first column and a separate second conveyor disposed with the second column, the first conveyor for transporting a carriage to and receiving the carriage from the second conveyor through a first port, the second conveyor for transporting the carriage to and receiving the carriage from the first conveyor through the first port, and the carriage configured to receive and hold one or more of the data cartridges.

2. The data cartridge library of claim 1, wherein each library module is capable of holding its respective data cartridges in a predetermined orientation, and the carriage is configured to receive and hold the one or more of the data cartridges in an orientation substantially identical to the predetermined orientation.

3. The data cartridge library of claim 2, wherein each of the plurality of library modules includes a front, the fronts generally aligning to form a plane, and the predetermined orientation of the data cartridge includes a dimension of the data cartridge being substantially perpendicular to the plane.

4. The data cartridge library of claim 3, further comprising a first picker disposed with the first conveyor, the first picker rotatable about an axis of rotation generally parallel with the plane, the first picker for retrieving data cartridges from and providing data cartridges to the carriage.

5. The data cartridge library of claim 4, further comprising a plurality of data cartridge storage slots disposed along an arc swept, upon rotation of the first picker, by an end of the first picker distal from the axis of rotation.

6. The data cartridge library of claim 1, further comprising a shuttle for transporting a data cartridge along the first column of library modules.

7. The data cartridge library of claim 1, wherein the first conveyor includes a belt having a first surface with teeth formed thereon, the teeth for meshing with teeth formed on an underside of the carriage.

8. The data cartridge library of claim 7, wherein the belt has a second surface with teeth formed thereon for meshing with teeth of a drive gear about which the belt is wrapped.

9. The data cartridge library of claim 1, wherein the first conveyor is disposed in a first link module and the second conveyor is disposed in a second link module, and the port is defined by substantially aligned openings defined in each of the first link module and the second link module.

10. The data cartridge library of claim 1, wherein the first column and the second column are disposed generally perpendicular to a base surface, and the carriage is transported by the first conveyor and the second conveyor generally parallel to the base surface.

11. The data cartridge library of claim 1, further comprising
a third column of library modules; and
a third conveyor disposed with the third column, the third conveyor for transporting the carriage to and receiving the carriage from the second conveyor through a second port between the third column and the second column, and the second conveyor further for transporting the carriage to and receiving the carriage from the third conveyor through the second port.

12. The data cartridge library of claim 1, wherein each of the plurality of library modules includes a front, the fronts of the library modules in the first column generally aligning to define a first plane, further comprising
a third column of library modules, each library module in the third column including a front, the fronts of the library modules in the third column generally aligning to define a second plane, the first plane and the second plane non-parallel, and
an adapter disposed between the third column and the second column, the adapter including a third conveyor rotatable about an axis substantially parallel to a height dimension of the third column, the third conveyor for receiving the carriage from the second conveyor through a second port and rotating to align with a third port through which the carriage may be conveyed to the third column of library modules.

13. An automated data cartridge library module, comprising:
a generally rectangular housing having a length dimension, a height dimension and a width dimension, the rectangular housing configured for use in a generally columnar array comprising a plurality of library modules, the housing defining a port;
a belt looped around a drive gear and a support gear, the belt generally perpendicular to the port and generally parallel to the width dimension of the housing, and the drive gear rotatable by a motor; and
a carriage removably disposed on the belt, the carriage sized to fit through the port for receipt by an adjacent library module and configured to hold one or more data cartridges, the carriage conveyable on the belt upon rotation of the drive gear by the motor.

14. The automated data cartridge library module of claim 13, further comprising:
a picker disposed proximate the belt, and rotatable about an axis of rotation generally perpendicular to the belt and generally parallel to the height dimension of the housing, the picker interfacing with a shuttle configured for transporting cartridges from one of the plurality of library modules in the generally columnar array and for inserting data cartridges in and removing data cartridges from the carriage.

15. A modular data cartridge library method, comprising:
retrieving a data cartridge from a slot in a library module, the slot configured for holding the data cartridge in a predetermined orientation, the library module being one of a plurality of library modules arranged in a first column;
disposing the data cartridge on a carriage disposed on a first conveyor, the data cartridge disposed in an orientation generally identical to the predetermined orientation; and
conveying the carriage through a first port to a second conveyor of a second column of library modules disposed adjacent to the first column while maintaining the orientation of the data cartridge in the carriage.

16. The modular data cartridge library method of claim 15, wherein the first column and the second column are generally perpendicular to a base surface, and the carriage is conveyed in a direction generally perpendicular to a height dimension of the first column.

17. The modular data cartridge library method of claim 16, further comprising:
further conveying the carriage in a direction generally perpendicular to the
height dimension of the first column through a second port to a third conveyor of a third column of library modules disposed adjacent to the second column while maintaining the orientation of the data cartridge in the carriage.

* * * * *